Jan. 19, 1960  O. HAUGWITZ  2,921,429
SYSTEMS FOR PRODUCING MULTI-STRAND TWISTED
ASSEMBLIES SUCH AS CABLES
Filed July 23, 1956  2 Sheets-Sheet 1

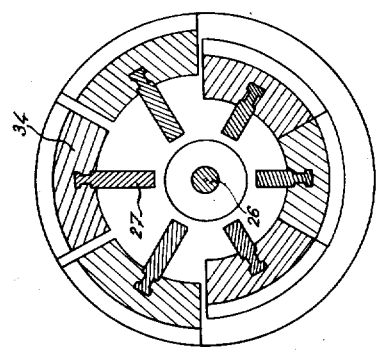
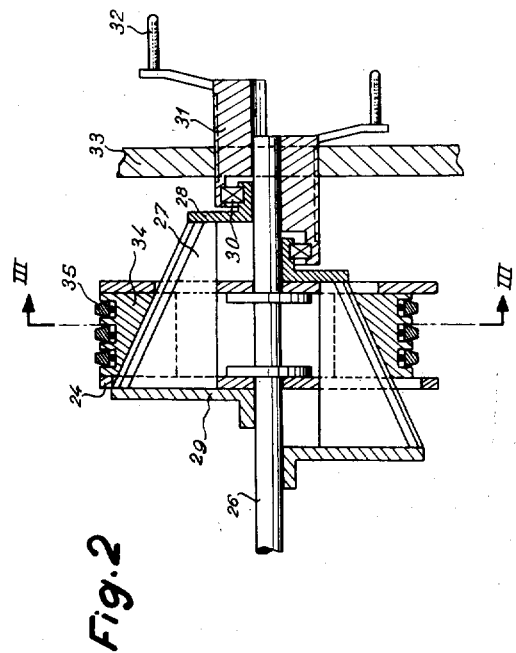

United States Patent Office
2,921,429
Patented Jan. 19, 1960

2,921,429

SYSTEMS FOR PRODUCING MULTI-STRAND TWISTED ASSEMBLIES SUCH AS CABLES

Otto Haugwitz, La Celle Saint Cloud, France, assignor to Société Anonyme Geoffroy-Delore, Paris, France, a French company Application July 23, 1956, Serial No. 599,444

Claims priority, application France March 8, 1956

3 Claims. (Cl. 57—58.52)

This invention relates to systems for producing multi-strand twisted assemblies such as cables, wire ropes, and the like, e.g. bare or insulated electric cable conductors, and it is a general object of the invention to provide an improved highspeed system of this kind.

A known system for the high-speed assembly of cables and similar multi-strand twisted elements, involves a dual twisting action and operates generally as follows. The component strands are fed from individual supply reels, through a distributer grid structure in which a uniform spacing is imparted to the strands, and then to a combining or assembling station where the strands are brought together or combined into one. The resulting assembly of untwisted strands is then passed over a revolving twister frame including a number of guide pulleys bodily rotated about the general axis of the input cable strands, and has a first twist imparted thereto between the combining station and the input to the twister frame. From the twister frame the pre-twisted cable passes through a stationary guide sleeve or cradle lying on the axis of rotation of the frame, and is fed by a receiver winch to a take-up reel to be finally wound into a coil. In this process a second twisting action is imparted to the cable strands at the outlet of the twister frame, within the axial guide cradle.

The force applied to the twisted cable by the receiver winch must overcome the retarding forces developed in the individual supply reels, as well as the friction forces set up over the twister frame and in the remaining components of the system. The total load thus applied to the cable must nevertheless remain lower than a predetermined safety limit to prevent the cable from being broken or objectionably stretched.

When it is desired to increase the capacity of the final coil of cable, take-up reels with large-diameter side flanges are used, and this entails a corresponding increase in the diameter of the twister frame revolving about said take-up reel, in order to permit the frame clearing the outer diameter of the reel. Increasing the twister frame diameter increases the centrifugal force applied to the cable section passed around the frame, and this in turn greatly increases the frictional forces set up in the frame and the load applied to the cable. Thus it is seen that for given permissible values of friction and maximum load, any increase in the diametric dimensions of the twister frame necessitates a reduction in its rate of rotation, and hence reduces the output capacity of the system.

It is therefore an object of this invention to increase the capacity of a cable twisting system of the specified type without increasing the tension load to which the cable is subjected therein; an equivalent object is to increase the diameter of the take-up reel in such a system.

In systems of the type just described, the tension of the cable during the twisting operation is controlled by adjusting the rate of rotation of the receiver winch provided just before the take-up reel. It is an object of this invention to provide for twist tension control in a more flexible and advantageous manner.

In accomplishing the above objects according to one aspect of the invention, the invention provides in a high-speed cable twisting system, having a supply station in which the individual cable strands are supplied, a combining station in which said strands are combined into one, a revolving twister frame imparting a two-stage twisting action to the strands, a receiver winch for feeding the twisted cable and a take-up reel on which said cable is wound, an additional cable feeding winch between the supply station and the combining station. This additional winch, which may be termed an "input" or "donor" winch, serves to compensate for the retarding forces developed in the supply reels and to ensure that all the individual strands are delivered at strictly equal rates and under equal tensions. Furthermore it permits accurate and flexible control of the final twisting tension through adjustment of the differential rates of rotation of the input winch and the output or receiver winch, or the effective diameter of the winch.

Another object of the invention is the provision of an improved form of revolving twister frame for a cable twisting system of the specified type, wherein the frictional forces on the cable will be reduced to a negligible value. In accordance with this object, the cable guiding parts of the twister frame are so shaped as to conform substantially with the equilibrium configuration assumed by the cable under the resultant of the tension force applied to it and the centrifugal force developed by the rotation of the frame.

Another object is the provision of an improved variable-diameter winch.

The above and further objects, features and advantages of the invention will appear fully as the description proceeds, with reference to the accompanying drawings wherein some embodiments of the invention are illustrated by way of example but not of limitation.

Fig. 2 is an axial sectional view of a variable-diameter winch according to the invention.

Fig. 3 is a cross section on line III—III of Fig. 2, and

Figure 1:
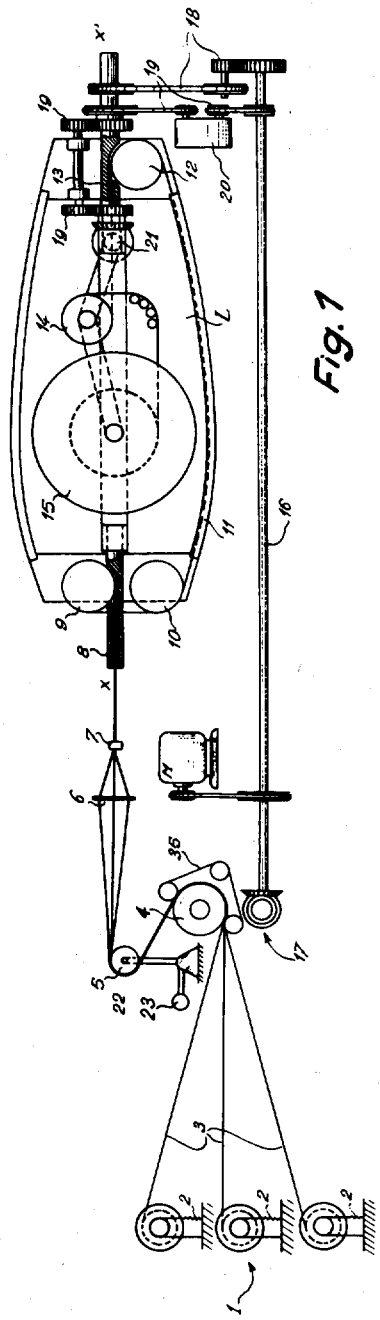
Fig. 1 is a diagrammatic representation of a cable twisting system according to the invention.

Referring to Fig. 1, which shows by way of example a twisting system for a three-strand cable, the supply station is shown at 1 as including three supply reels for delivering the individual strands 3. The suppy reels are provided with suitable retarding means such as the spring braking arrangements diagrammatically indicated at 2. The three strands 3 issuing from the supply reels are taken up by a winch 4 which constitutes the input or donor winch of the invention. The winch 4 is positively driven and feeds the three strands at strictly equal rates over a guide pulley 5, whence the strands are passed through a spacer or distributor grid device 6 and to a combining station 7. From the combining station the strands are passed through a tubular guide 8, and thence over first and second idler pulleys 9 and 10 supported from a twister frame generally designated L, and which is mounted for rotation about an axis XX' coinciding with that of the input section of cable strands passed through the input guide 8. The twister frame L includes a tubular guide 11 extending generally in a meridian plane thereof and having a specially predetermined arcuate configuration to be later specified. From the tubular guide 11 the pre-twisted cable strands are passed over an output idler puller 12 journalled on the frame L adjacent its output end and are introduced into a stationary axial conduit or guide 13 extending along the axis of rotation of the frame and projecting inwardly thereof. The twisted cable issuing from tubular, guide 13 is taken up by the output or receiver winch 14 and is finally taken up on the wind-up reel 15 rotated about an axis intersecting and normal to the axis XX' of the frame 11.

Power for rotating the various components of the system is derived (in the embodiment shown by way of example) from a common motor M which drives the common input shaft 16. Shaft 16 through suitable gearing 17 drives the input winch 4. Through a transmission 18 including gearing and belt drive as shown, the shaft XX' of the twister frame L is likewise driven off shaft 16. It will be understood that the idler pulleys 9, 10 and 12 and the tubular cable guide 11 are all rotated bodily with the frame around the shaft XX', resulting in a first twisting action on the cable in the section between combining station 7 and input pulley 9, and in a second twisting action in the section between output pulley 12 and receiver winch 14. This winch 14 as well as the take-up reel 15 are driven off shaft 16 through a transmission 19 comprising drive belts and gearing as shown imparting rotation to a shaft 21 journalled in a stationary support within the twister frame, whence the drive is communicated through a further belt drive to the winch 14 and reel 15. A variable drive device 20 is preferably interposed within the transmission from shaft 16 to shaft 21.

As a result of the provision of the input winch 4 according to the invention, the cable strands delivered to the combining station 7 have a substantially zero tension on reaching said station. As already mentioned however a low definite tension has to be imparted to the cable during the twisting action, and for this purpose according to the invention a predetermined velocity lead is imparted to the receiver or output winch 14 relatively to the donor or input winch 4, as will be more fully disclosed hereinafter.

The output winch 14 in this arrangement only has to overcome the sum total of the friction of the cable in the twister frame and the operating tension just specified. For a given value of the traction lead applied to the cable by the output winch, the provision of the input winch will therefore make it possible to handle higher frictional forces developed in the twister frame. Thus it will become possible to increase either the speed of rotation of the frame and hence increase the output rate of the machine, or to increase the diameter of said frame and hence increase the capacity of the take-up reel, or both.

The above advantages of the improved system are yet further enhanced by the shape imparted according to the invention to the twister frame. The cable guide 11 is so shaped as to conform substantially with the curved configuration which would be assumed by the cable in the absence of the guiding means, under the sole action of the resultant of the tension force imparted to it by the winches and the centrifugal force developed by the rotation of the frame in operation. If the configuration of the cable guide corresponds to this ideal equilibrium curve, it will be apparent that the cable will not be subjected to any friction whatever over the length of the cable guide. The curve moreover is so predetermined that the maximum diameter of the cable guide is located substantially in the plane extending through the axis of the take-up reel 15 normally to the frame axis XX'.

It can be demonstrated that provided the cable tension is correctly adjusted in dependency on the unit weight of the cable being handled (or the cross section thereof), the optimum cable guide configuration just specified remains the same regardless of the size of cable being handled.

Means will now be described in accordance with the invention for controlling the cable tension during the twisting process. According to one method, the pulley 5 receiving the strands from the input winch 4 and provided in the form of a multi-groove pulley, may be mounted for idle rotation on one end of a lever arm 22. Means such as an adjustable counterweight 23, or an adjustable spring biasing device if preferred, is provided for imparting the desired tension to the strands. Alternatively, the pulley 5 may be mounted on a movable carriage.

According to another method, as already mentioned, the tension may be adjusted by acting on the variable drive device 20 to control the amount by which the rotation of the output winch 14 leads the rotation of input winch 4.

In yet another embodiment, the rate of rotation of either the input winch or/and the output winch may be controlled through an electrical control system, manually or automatically operated. Thus any suitable potentiometric or inductive system, i.e. a self-synchronous remote control system, may be used. Advantageously the control is made responsive to the position of the lever arm 22, since the angular position of this lever arm may be taken as a measure of the speed differential between the two winches. Any conventional servo-system (i.e. self-synchronous), may thus be provided for acting on an electromagnetic friction clutch or the like through which either one of the winches 4 or 14 is driven, in response to angular positional signals generated by a transmitter operated by the lever 22. No such system has been illustrated herein since the design thereof will be apparent to those familiar with the art.

According to another feature of the invention, and in view of the fact that the speed differential between the input and output winches 4 and 14 will never exceed a comparatively small range, i.e. a few percent, the requisite tension adjustment may be readily obtained by using an input winch 4 having a variable effective diameter as will now be described.

One suitable construction of such a winch is shown in Figs. 2 and 3. The winch comprises a number, e.g. six, of sectors 34 conforming to the mean radius desired for the winch. In the drawings, the upper half of the figures shows the condition of the sectors expanded to provide the maximum winch diameter, while the lower half illustrates the condition with the sectors contracted to provide a minimum diameter winch. The sectors 34 are internally formed with dovetail guideways extending at an angle to the common axis of the sectors, in which are slidably received the complementary outer edges of corresponding trapezoidal plates 27. The sectors 34 are secured between a pair of side plates or discs 24 and 25 formed with slots therein through which the plates 27 freely extend. The discs 24 and 25 are formed with center apertures through which the winch shaft 26 rotatably extends, and said discs are prevented from axial displacement on the shaft by a pair of radial flanges projecting from the shaft and abutting the inner faces of said discs, as shown in Fig. 2. The axial length of the trapezoidal discs 27 is greater than the axial length of the winch sectors 34, and said plates are secured at their opposite ends to respective flanges 28 and 29 which are axially slidable relative to the shaft 26, discs 24 and 25 and sectors 34. Engaging a threaded aperture formed in a stationary frame wall 33 is a screw shaft 31 having a crank arm 32 secured to its outer end, while the inner end of the screw shaft is connected by drive element 30 with the flange member 28, in such a way that the member 28 is connected for axial displacement with, but is rotatable relative to, the screw shaft 31. Thus it will be apparent that rotation of the screw shaft by means of crank arm 32 will produce an axial shift of the members 28, 29 and trapezoidal plates 27 in one or the other direction along the shaft 26, and will correspondingly produce a radial movement inwards or outwards of all the sectors 34, so as to modify the effective diameter of the winch. The outer periphery of the sectors 34 is formed with groove sections, in the bottoms of which the strands of the cable are passed. Surrounding part of the periphery of the input winch or pulley 4 and overlying the strands to insure firm engagement thereof are endless drive belts 35 which may be arranged in the general manner indicated on Fig. 1.

Figure 4:
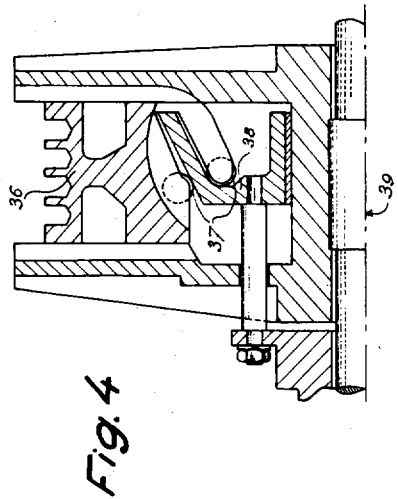
Fig. 4 is an axial sectional view of a modified form of variable-diameter winch.

Fig. 4 illustrates a different construction of a variable-diameter winch. Herein, the trapezoidal plates such as 27 are omitted and there is provided instead a frustoconical member 38 arranged for axial sliding movement along the winch shaft 39 and engaged inwardly and outwardly thereof by pairs of balls or rollers such as 37 adapted to exert the requisite radial pressure on the winch sectors 36. Otherwise the general arrangement of the variable-diameter winch in Fig. 4 is similar to that described above in connection with Figs. 2 and 3 and is not further described.

It will be apparent that various modifications may be made in the systems illustrated and described without exceeding the scope of the invention. Thus, the invention is applicable to a system arranged for imparting a single twisting stage to the cable, or to a system imparting more than two twisting stages thereto, instead of the two-stage twisting system shown. The number of strands in the cable is of course immaterial. According to one modification, not illustrated but readily understandable, the output or receiver winch may be omitted and the traction force on the cable may be imparted by the wind-up reel directly.

What we claim is:

1. A multi-strand cable twisting system comprising, in combination, a plurality of reels for supplying the strands, a combining station downstream of said reels, an input winch upstream of said combining station, an output winch downstream of said combining station, a multi-groove guide pulley disposed between said input winch and said combining station to receive the strands passing therebetween, said guide pulley being mounted on a movable support subjected to the action of a force opposing the force exerted by the strands to be combined, whereby the position of said movable support provides a measurement of the strand tension, and means for varying during the operation of the system the peripheral linear speed of the input winch relative to that of the output winch.

2. A multi-strand cable twisting system as defined in claim 1, wherein one of said winches is in the form of a multi-groove, variable diameter pulley divided into a plurality of segments which are radially slidable during operation of the system under the action of means having a tapered surface with which said segments are in inner engagement, said means being slidable along the shaft of said pulley under the action of an actuatable positioning element adapted to be adjusted to correspond to the desired tension.

3. A multi-strand cable twisting system as defined in claim 2, wherein endless belts under tension surround part of the periphery of the grooves of said pulley to insure engagement of the strands to be combined.

References Cited in the file of this patent

UNITED STATES PATENTS

| | | |
|---|---|---|
| 794,516 | Kron | July 11, 1905 |
| 1,374,439 | Doherty | Apr. 12, 1921 |
| 1,952,929 | Littlefield | Mar. 27, 1934 |
| 2,002,975 | Brooks | May 28, 1935 |
| 2,773,344 | Van Hook | Dec. 11, 1956 |